H. THOMPSON.
Revolving Harrow.
No. 55,024.  Patented May 22, 1866.
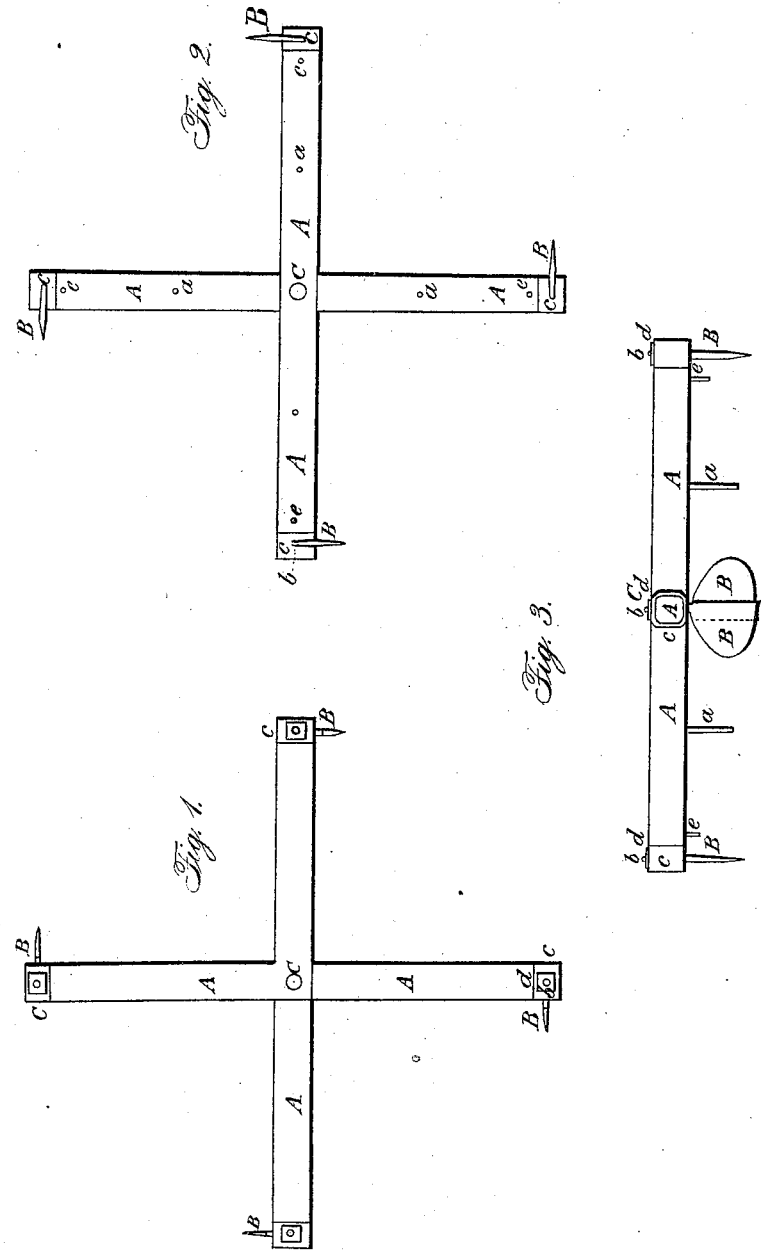
Witnesses:
Samuel N. Piper
J. Curtis
Inventor:
Henry Thompson
by his Attorney
R. H. Eddy

UNITED STATES PATENT OFFICE.

HENRY THOMPSON, OF ROCKLAND, MAINE, ASSIGNOR TO HIMSELF, D. C. HASKELL, AND C. H. HASKELL, OF SAME PLACE.

IMPROVEMENT IN ROTARY HARROWS.

Specification forming part of Letters Patent No. 55,024, dated May 22, 1866.

*To all whom it may concern:*

Be it known that I, HENRY THOMPSON, of Rockland, in the county of Knox and State of Maine, have made a new and useful Improvement or Invention having reference to Rotary Harrows; and I do hereby declare the same to be fully described in the following specification, and represented in the accompanying drawings, of which—

Figure 1 is a top view, Fig. 2 an under side view, Fig. 3 a side elevation, of the rotary part or head of a harrow as made in accordance with my invention, which consists of the combination and arrangement of what is termed a "stream" or "current" wheel and a series of harrow-teeth projected therefrom.

In the drawings, A A A A are four arms radiating from one common center, C, and arranged at right angles to each other. Each of such arms has one or more teeth, $a\ a$, extending down from it at right angles to it. Such arm is also provided with a wing or float, B, formed like a vessel's rudder and applied to the arm so as to revolve thereon as a rudder-post turns in its socket—that is, each of the wings has a spindle, $b$, to extend up from it into and through the arm, and a metallic collar, $c$, fixed on the arm, the said spindle being held in place by a head or nut, $d$, applied to its top. Furthermore, there is a small stud, $e$, projecting down from each arm just in rear of the spindle of the wing of such arm, the purpose of such stud being to arrest the wing or prevent it from revolving past the stud.

The rotary harrow-head so made is to be attached to the draft part of the harrow as are other rotary heads of harrows, and when drawn over the ground the wing will take into the earth and put the head in revolution in a way similar to that in which a current-wheel is set in revolution by a current of water. Each of the teeth will thus be moved in an epicycloidal path or a close approximation thereto, and the path of one will cross those of the others, so as to break up the land to good advantage.

What I claim as my invention is—

The revolving harrow-head made of the series of rotary wings B, their studs $e$, the harrow-teeth $a$, and arms A, or their equivalent, the whole being arranged substantially in manner and so as to operate as described.

HENRY THOMPSON.

Witnesses:
 R. H. EDDY,
 F. P. HALE, Jr.